June 17, 1924.
C. W. ROBINSON ET AL
1,498,203
TRACTOR DISK HARROW
Original Filed Nov. 29, 1920    2 Sheets-Sheet 2
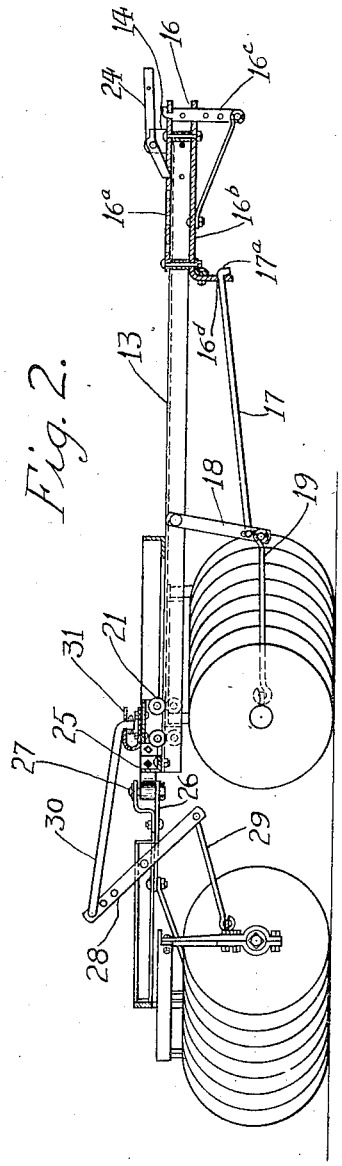
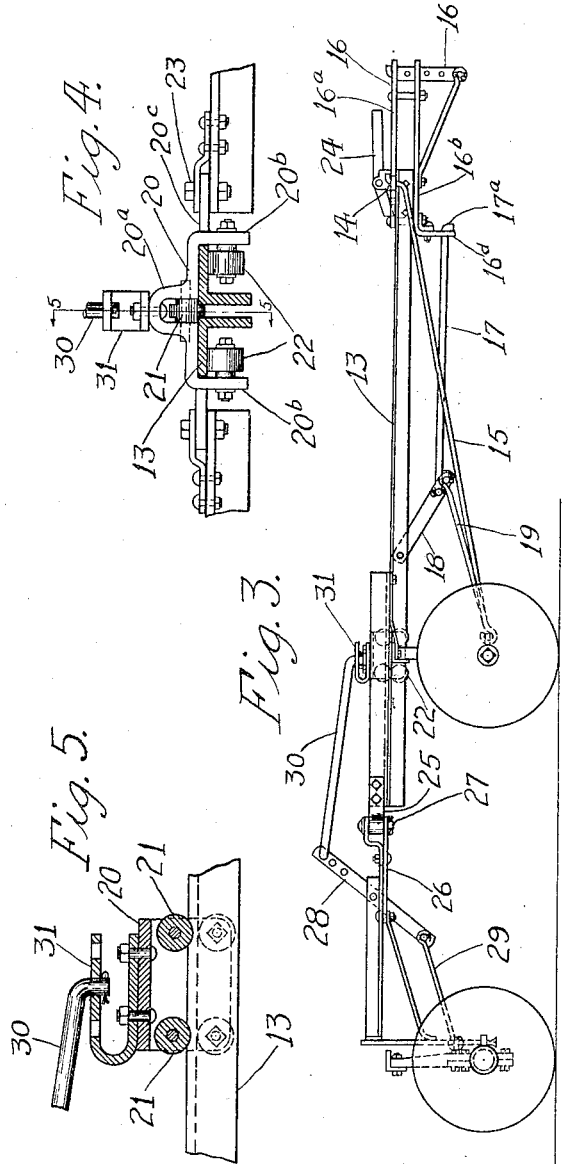
Inventors:-
Charles W. Robinson,
and Joseph I. Mitchell,
By W. P. Doolittle
Atty.

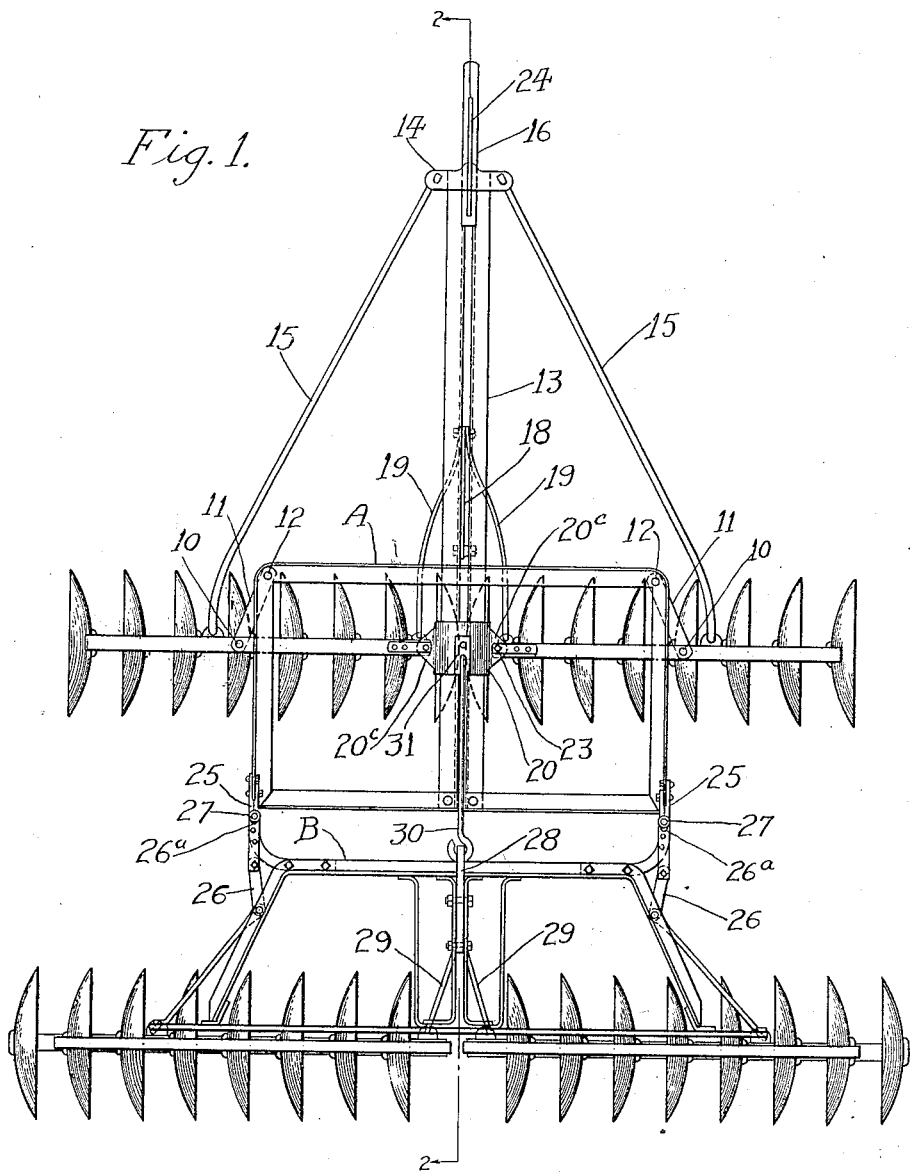

Patented June 17, 1924.

1,498,203

UNITED STATES PATENT OFFICE.

CHARLES W. ROBINSON AND JOSEPH I. MITCHELL, OF AUBURN, NEW YORK, ASSIGNORS TO INTERNATIONAL HARVESTER COMPANY, A CORPORATION OF NEW JERSEY.

TRACTOR DISK HARROW.

Application filed November 29, 1920, Serial No. 427,007. Renewed November 26, 1923.

*To all whom it may concern:*

Be it known that we, CHARLES W. ROBINSON and JOSEPH I. MITCHELL, citizens of the United States, and residents, respectively, of Auburn, in the county of Cayuga and State of New York, and of Auburn, in the county of Cayuga and State of New York, have invented certain new and useful Improvements in Tractor Disk Harrows, of which the following is a full, clear, and exact specification.

Our invention relates to tandem disk harrows of the type where the power of the draft means, usually a tractor, is employed to actuate the gang controlling devices. Our objects are to provide a harrow in which the gang controlling mechanism is greatly simplified and the mechanism for angling the gangs on the front section is made to serve for the rear section as well, and in which the rear section may be readily detached and the front section used alone, if desired, and also to couple the front and rear sections or frames of the harrow in a novel and simplified manner.

We accomplish these objects by employing a construction in which there are two horizontally positioned angular frames connected at their outer ends by detachable couplings of novel type and by providing independent gang angling devices on each frame, one of which is controlled by a sliding draft head adapted to be connected to a tractor, the two angling devices being connected by readily detachable means including a movable saddle-shaped plate which connects the gangs on the front frame and moves with them.

With these main objects in view our invention consists of the organization and details of construction, or their equivalents, herein described and partcularly defined in the claims. Having reference to the drawings—

Fig. 1 is a plan view of the tandem disk harrow embodying our invention.

Fig. 2 is a central vertical section on the line 2—2, Fig. 1, with the gangs in angled position.

Fig. 3 is a side elevation with the gangs straightened.

Fig. 4 is an enlarged detail view of the saddle plate connecting the front gangs.

Fig. 5 is a vertical section on the line 5—5 of Fig. 4.

In the present instance we have illustrated the improvements constituting our invention in connection with a tandem harrow comprising a front frame or section A and a rear frame or section B, each provided with the usual pair of pivoted disk gangs. The gangs on the front frame are preferably connected to the frame by being pivoted at 10 to links 11 connected to the forward angles of the frame at 12. The front frame includes a pair of longitudinally extending spaced angle bars 13 which project forwardly from the frame proper and have a cross piece 14 fixed to their outer ends to which is secured the brace bars 15 which are connected to the gangs in proximity to their pivot points. The forward ends of the angle bars 13 also carry a shiftable draft head 16 which is composed of an upper notched plate $16^a$ and a lower plate $16^b$ connected by bolts positioned in the space between the angle bars and by a vertical clevis member $16^c$, provided with a series of apertures for attachment of the draft coupling. The rear end of plate $16^b$ is bent downwardly to provide the depending portion $16^d$ which is apertured to receive the hooked end $17^a$ of a rod 17 which has its other end pivoted to a depending rock arm 18 on the frame. The lower end of this rock arm has a pair of links 19 connecting it with the front gangs. On the rear ends of the angle bars 13 there is mounted a gang-connecting member comprising a saddle-shaped plate 20 which straddles the angle bars and is formed with an arched central portion $20^a$ in which are journaled rollers 21 which bear on the upper face of the angle bars and have enlarged central portions engaged in the space between them. The plate 20 also carries the rollers 22 which are journaled in vertical portions $20^b$ of the plate and positioned to engage the under faces of the bars, as best seen in Fig. 4. On each side of plate 20 is provided lateral ears $20^c$ which are pivoted at 23 to the gang frames.

It will be evident that with the structure above described movement of the draft head 16 in a forward direction on angle bars 13 will communicate movement through rod 17 to the inner ends of the gangs to draw them into parallel or non-working position when desired, and also that the draft head 16 may be moved rearwardly on the angle bars independently of rod 17 which then slides in the aperture in plate 16ᵇ, and in this manner permits the angle of the gangs to be set by rearward movement of the draft head. The position at which the draft head is to be locked, and therefore the angle the gangs will assume on forward movement of the harrow, is determined by a latch 24 which is mounted on plate 14 and engages the series of notches in plate 16ᵃ. It is also evident that as the front gangs are swung into and out of working position, the plate 20 will move with them with a minimum of resistance, owing to its rolling connection with the angle bars.

The rear angles of the front frame and the forward angles of the rear frame are connected by couplings which include rearwardly projecting brackets 25 fixed to the front frame and provided with vertically extending apertures at their ends, and brackets 26 fixed to the rear frame and formed with spaced arms provided with short slots 26ᵃ, the arms being adapted to embrace the front brackets and to be slidably interlocked therewith by a coupling pin 27 in the slots and apertures of the respective brackets, this construction providing a draft connection between the front and rear harrow sections sufficiently rigid to cause proper tracking of the gangs while permitting a certain degree of flexibility between the frames.

The angling mechanism for the rear gangs comprises a lever 28 pivoted intermediate its ends at the center of the rear frame and having links 29 connected to its lower end which are in turn connected to the inner ends of the rear gangs. The upper end of lever 28 is a forwardly extending rod 30 pivoted thereto in one of a series of apertures and this rod has its forward end bent downwardly to selectively engage a series of apertures formed in the upper arm of a staple-shaped coupling member or clevis 31 which is secured to the arched portion of plate 20, thus providing a readily detachable connection between the angling mechanisms for the front and rear gang as well as one affording independent means for adjusting the angle of the rear gangs. With the gangs connected as above described, and the rear angling mechanism connected to plate 20 by rod 30, it will follow that forward movement of plate 20 will cause opposite movement of the rear gangs, causing the gangs on the two sections to be moved in opposite directions from the working to non-working position and vice versa. In operation the harrow is transported with the gangs and draft head positioned as seen in Fig. 1. When it is desired to throw the gangs into working position the draft head 16 is moved rearwardly on bars 13 to the extent desired where it is retained by latch 24 and the harrow then pulled forwardly causing the gangs to fall into angled position until the hooked end of rod 17 engages the bent end 16ᵈ of plate 16ᵇ. When desired the rear section may be readily detached from the front by withdrawing pins 27 and detaching rod 30 from clevis 31, and the front section used as a single harrow.

The above description discloses but one form which our invention may take and such changes may be made as fall within the scope of the following claims.

We claim as our invention:

1. A disk harrow comprising front and rear connected frames, pivotally mounted gangs on each frame, a gang angling device mounted on the front frame and connected to the gangs thereon, a member pivotally connecting the inner ends of said gangs and movable back and forth therewith and angling means for the rear gangs comprising a lever pivotally mounted between its ends at a point behind said member and links connecting one end of said lever to said member and its other end to the rear gangs.

2. A disk harrow comprising front and rear connected frames, pivotally mounted gangs on each frame, a gang angling device shiftably mounted on the front frame and connected to the gangs thereon, a connecting member pivoted to the inner ends of said gangs and movable in a fore and aft direction therewith, a lever mounted on one of the frames and connected to the rear gangs and a link connected to one end of said lever and to the gang connecting member on the front frame.

3. A disk harrow comprising front and rear connected frames, pivotally mounted gangs on each frame, central longitudinally extending members on the front frame, a gang angling device shiftably mounted on the forward ends of the longitudinal members and connected to the gangs on the front frame, a gang connecting member pivoted to the inner ends of said gangs and mounted to move in a fore and aft direction on the rear ends of said longitudinal members, a lever pivoted intermediate its ends on one of the frames, links connecting one end of said lever to the rear gangs and a link connected to the other end of said lever and having an adjustable connection with the gang connecting member on the front frame.

4. A disk harrow comprising front and rear connected frames, pivotally mounted gangs on each frame, central longitudinally extending members on the front frame comprising a pair of spaced angle bars, a gang angling device shiftably mounted on the forward ends of the bars and connected to the gangs on the front frames, a plate pivotally connecting the inner ends of said gangs and provided with rollers having portions engaged in the space between said bars, angling means mounted on the rear frame and connected to the rear gangs, and an operating connection between the gang connecting plate and the rear gang angling means.

5. A disk harrow comprising front and rear connected frames, pivotally mounted gangs on each frame, central longitudinally extending members on the front frame comprising a pair of spaced angle bars, a gang angling device shiftably mounted on the forward ends of the angle bars and connected to the gangs on the front frame, a saddle-shaped plate straddling the angle bars and pivotally connected to the inner ends of the front gangs, rollers journaled in said plate for engagement with top and bottom faces of said angle bars, gang angling means mounted on the rear frame and connected to the rear gangs, and a link adjustably connecting the saddle-plate to the rear gang angling means.

6. A disk harrow comprising front and rear horizontally positioned frames, gang angling mechanism on each frame, complemental coupling brackets fixed to the outer ends of the front and rear frames, interlocking means connecting the brackets of the respective frames, and coupling means uniting the gang angling mechanisms of the front and rear frames.

7. A disk harrow comprising front and rear horizontally positioned angular frames, gang angling mechanism on each frame, rearwardly projecting coupling brackets fixed to the rear angles of the front frame and having their ends provided with apertures, coupling brackets fixed to the front angles of the rear frame and having slotted arms enbracing the ends of the front brackets, coupling pins passing through said apertures and slots for connecting the respective brackets and a link uniting the gang angling mechanisms on the front and rear frames.

8. A trailer section for a tandem disk harrow, comprising a horizontally positioned frame, gangs pivoted on the frame, forwardly extending coupling brackets fixed to the outer ends of the frame and formed with spaced apertured arms, a lever pivoted intermediate its ends on the frame, links connecting one end of the lever with the gangs and a coupling element connected to the opposite end of the lever and having means adapted for engagement with another harrow section.

9. A disk harrow comprising front and rear frames carrying disk gangs, coupling means between the frames comprising bracket members fixed to the outer portions of the front and rear frames respectively, and complemental interlocking parts on the ends of the brackets including means permitting one bracket member to have movement longitudinally of the other.

10. A disk harrow comprising front and rear frames carrying disk gangs, coupling means between the frames comprising bracket members fixed to the outer portions of the front and rear frames respectively, and interlocking elements on the ends of the brackets including openings in the brackets on one of the frames in which the ends of the brackets on the other frame are slidably held.

11. In a harrow, front and rear frames, pivotally mounted disk gangs on each frame, means for shifting the front gangs to and from working angles, a lever pivoted intermediate its ends on one of the frames at a point between the front and rear gangs, a link connecting the upper end of said lever with the front gangs for movement therewith, a link between the lower end of said lever and the gangs on the rear frame, and longitudinally slidable couplings between the frames.

In testimony whereof we affix our signatures, in the presence of two witnesses.

CHARLES W. ROBINSON.
JOSEPH I. MITCHELL.

Witnesses:
F. A. Pritchard,
R. A. Marland.